(12) United States Patent
Moorehead et al.

(10) Patent No.: US 7,455,112 B2
(45) Date of Patent: Nov. 25, 2008

(54) METHODS AND COMPOSITIONS RELATING TO THE CONTROL OF THE RATES OF ACID-GENERATING COMPOUNDS IN ACIDIZING OPERATIONS

(75) Inventors: Alan W. Moorehead, Houston, TX (US); William W. Shumway, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 44 days.

(21) Appl. No.: 11/536,833

(22) Filed: Sep. 29, 2006

(65) Prior Publication Data

US 2008/0078549 A1   Apr. 3, 2008

(51) Int. Cl.
*E21B 43/27* (2006.01)
(52) U.S. Cl. .................. 166/307; 166/282; 166/300; 166/308.2
(58) Field of Classification Search .......... None
See application file for complete search history.

(56) References Cited

U.S. PATENT DOCUMENTS

| | | | |
|---|---|---|---|
| 1,922,154 A | 8/1933 | deGroote | 166/21 |
| 2,050,932 A | 8/1936 | deGroote | 166/21 |
| 2,059,459 A | 11/1936 | Hund et al. | 166/21 |
| 2,206,187 A | 7/1940 | Herbsman | 166/21 |
| 2,238,671 A | 4/1941 | Woodhouse | |
| 2,681,889 A | 6/1954 | Menaul et al. | 252/8.55 |
| 2,703,316 A | 3/1955 | Palmer | |
| 2,863,832 A | 12/1958 | Perrine | 252/8.55 |
| 2,910,436 A | 10/1959 | Fatt et al. | 252/8.55 |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,630,285 A | 12/1971 | Claytor et al. | 166/300 |
| 3,784,585 A | 1/1974 | Schmitt et al. | |
| 3,819,525 A | 6/1974 | Hattenbrun | |

(Continued)

FOREIGN PATENT DOCUMENTS

EP   0 510 762   10/1992

(Continued)

OTHER PUBLICATIONS

U.S. Appl. No. 11/336,475, Jan. 20, 2006, Moorehead, et al.

(Continued)

*Primary Examiner*—Zakiya W. Bates
(74) *Attorney, Agent, or Firm*—Craig W. Roddy; Baker Botts, L.L.P.

(57) ABSTRACT

Of the many methods provided, in one embodiment, a method is provided that comprises: providing an acid-generating fluid that comprises an acid-generating compound, a base fluid, and a salt; placing the acid-generating fluid in a well bore penetrating a subterranean formation; allowing the salt to affect the hydrolysis of the acid-generating compound; and allowing the acid-generating compound to produce an acid that then acidizes at least a portion of the formation or damage contained therein.

20 Claims, 9 Drawing Sheets

U.S. PATENT DOCUMENTS

| | | |
|---|---|---|
| 3,828,854 A | 8/1974 | Templeton et al. |
| 3,836,465 A | 9/1974 | Rhudy et al. |
| 3,868,998 A | 3/1975 | Lybarger et al. |
| 3,912,692 A | 10/1975 | Casey et al. |
| 3,948,672 A | 4/1976 | Harnsberger |
| 3,955,993 A | 5/1976 | Curtice |
| 3,960,736 A | 6/1976 | Free et al. |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,169,798 A | 10/1979 | DeMartino |
| 4,172,066 A | 10/1979 | Zweigle et al. |
| 4,261,421 A | 4/1981 | Watanabe |
| 4,265,673 A | 5/1981 | Pace et al. |
| 4,267,887 A * | 5/1981 | Watanabe ............... 166/300 |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. |
| 4,848,467 A | 7/1989 | Cantu et al. |
| 4,863,980 A | 9/1989 | Cowan et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. |
| 4,986,353 A | 1/1991 | Clark et al. |
| 4,986,354 A | 1/1991 | Cantu et al. |
| 4,986,355 A | 1/1991 | Casad et al. |
| 5,034,139 A | 7/1991 | Reid et al. |
| 5,082,056 A | 1/1992 | Tackett, Jr. ............... 166/295 |
| 5,142,023 A | 8/1992 | Gruber et al. |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair |
| 5,247,059 A | 9/1993 | Gruber et al. |
| 5,249,628 A | 10/1993 | Surjaatmadja |
| 5,251,697 A | 10/1993 | Shuler |
| 5,295,542 A | 3/1994 | Cole et al. |
| 5,304,620 A | 4/1994 | Holtmyer et al. |
| 5,314,031 A | 5/1994 | Hale et al. |
| 5,325,923 A | 7/1994 | Surjaatmadja et al. |
| 5,330,005 A | 7/1994 | Card et al. |
| 5,359,026 A | 10/1994 | Gruber |
| 5,360,068 A | 11/1994 | Sprunt et al. |
| 5,363,916 A | 11/1994 | Himes et al. |
| 5,373,901 A | 12/1994 | Norman et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A | 8/1995 | Card et al. |
| 5,460,226 A | 10/1995 | Lawton et al. |
| 5,464,060 A | 11/1995 | Hale et al. |
| 5,475,080 A | 12/1995 | Gruber et al. |
| 5,484,881 A | 1/1996 | Gruber et al. |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. |
| 5,499,678 A | 3/1996 | Surjaatmadja et al. |
| 5,501,276 A | 3/1996 | Weaver et al. |
| 5,505,787 A | 4/1996 | Yamaguchi |
| 5,512,071 A | 4/1996 | Yam et al. |
| 5,536,807 A | 7/1996 | Gruber et al. |
| 5,555,936 A | 9/1996 | Pirri et al. |
| 5,591,700 A | 1/1997 | Harris et al. |
| 5,594,095 A | 1/1997 | Gruber et al. |
| 5,602,083 A | 2/1997 | Gabrysch et al. |
| 5,604,186 A | 2/1997 | Hunt et al. |
| 5,607,905 A | 3/1997 | Dobson, Jr. et al. |
| 5,613,558 A | 3/1997 | Dillenbeck |
| 5,670,473 A | 9/1997 | Scepanski |
| 5,697,440 A | 12/1997 | Weaver et al. |
| 5,698,322 A | 12/1997 | Tsai et al. |
| 5,723,416 A | 3/1998 | Liao |
| 5,765,642 A | 6/1998 | Surjaatmadja |
| 5,783,527 A | 7/1998 | Dobson, Jr. et al. |
| 5,791,415 A | 8/1998 | Nguyen et al. |
| 5,799,734 A | 9/1998 | Normal et al. |
| 5,833,000 A | 11/1998 | Weaver et al. |
| 5,849,401 A | 12/1998 | El-Afandi et al. |
| 5,853,048 A | 12/1998 | Weaver et al. |
| 5,888,944 A | 3/1999 | Patel |
| 5,893,416 A | 4/1999 | Read |
| 5,908,073 A | 6/1999 | Nguyen et al. |
| 5,916,849 A | 6/1999 | House |
| 5,924,488 A | 7/1999 | Nguyen et al. |
| 5,964,291 A | 10/1999 | Bourne et al. |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. |
| 6,024,170 A | 2/2000 | McCabe et al. |
| 6,028,113 A | 2/2000 | Scepanski |
| 6,047,772 A | 4/2000 | Weaver et al. |
| 6,110,875 A | 8/2000 | Tjon-Joe-Pin et al. |
| 6,114,410 A | 9/2000 | Betzold |
| 6,123,159 A | 9/2000 | Brookey et al. |
| 6,123,965 A | 9/2000 | Jacob et al. |
| 6,131,661 A | 10/2000 | Conner et al. |
| 6,135,987 A | 10/2000 | Tsai et al. |
| 6,143,698 A | 11/2000 | Murphey et al. |
| 6,148,917 A | 11/2000 | Brookey et al. |
| 6,162,766 A | 12/2000 | Muir et al. |
| 6,169,058 B1 | 1/2001 | Le et al. |
| 6,172,011 B1 | 1/2001 | Card et al. |
| 6,189,615 B1 | 2/2001 | Sydansk |
| 6,202,751 B1 | 3/2001 | Chatterji et al. |
| 6,209,643 B1 | 4/2001 | Nguyen et al. |
| 6,209,646 B1 | 4/2001 | Reddy et al. |
| 6,214,773 B1 | 4/2001 | Harris et al. |
| 6,242,390 B1 | 6/2001 | Mitchell et al. |
| 6,260,622 B1 | 7/2001 | Blok et al. |
| 6,291,013 B1 | 9/2001 | Gibson et al. |
| 6,300,286 B1 | 10/2001 | Dobson, Jr. et al. |
| 6,302,209 B1 | 10/2001 | Thompson et al. |
| 6,308,788 B1 | 10/2001 | Patel et al. |
| 6,311,773 B1 | 11/2001 | Todd et al. |
| 6,323,307 B1 | 11/2001 | Bigg et al. |
| 6,326,458 B1 | 12/2001 | Gruber et al. |

| | | | | | | |
|---|---|---|---|---|---|---|
| 6,328,105 B1 | 12/2001 | Betzold | | 7,093,664 B2 | 8/2006 | Todd et al. |
| 6,330,917 B2 | 12/2001 | Chatterji et al. | | 7,096,947 B2 | 8/2006 | Todd et al. |
| 6,357,527 B1 | 3/2002 | Norman et al. | | 7,101,829 B2 | 9/2006 | Guichard et al. |
| 6,364,945 B1 | 4/2002 | Chatterji et al. | | 7,131,491 B2 | 11/2006 | Blauch et al. |
| 6,380,138 B1 | 4/2002 | Ischy et al. | | 7,132,389 B2 | 11/2006 | Lee |
| 6,387,986 B1 | 5/2002 | Moradi-Araghi et al. | | 7,140,438 B2 | 11/2006 | Frost et al. |
| 6,390,195 B1 | 5/2002 | Nguyen et al. | | 7,147,067 B2 | 12/2006 | Getzalf et al. |
| 6,394,185 B1 | 5/2002 | Constien | | 7,151,077 B2 | 12/2006 | Prud'homme et al. |
| 6,422,314 B1 | 7/2002 | Todd et al. | | 7,153,902 B2 | 12/2006 | Altes et al. |
| 6,422,326 B1 | 7/2002 | Brookey et al. | | 7,156,174 B2 | 1/2007 | Roddy et al. |
| 6,432,155 B1 | 8/2002 | Swazey et al. | | 7,165,617 B2 | 1/2007 | Lord et al. |
| 6,454,003 B1 | 9/2002 | Chang et al. | | 7,166,560 B2 | 1/2007 | Still et al. |
| 6,485,947 B1 | 11/2002 | Rajgarhia et al. | | 7,168,489 B2 | 1/2007 | Frost et al. |
| 6,488,091 B1 | 12/2002 | Weaver et al. ............... 166/300 | | 7,172,022 B2 | 2/2007 | Reddy et al. |
| 6,488,763 B2 | 12/2002 | Brothers et al. | | 7,178,596 B2 | 2/2007 | Blauch et al. |
| 6,494,263 B2 | 12/2002 | Todd | | 7,195,068 B2 | 3/2007 | Todd |
| 6,508,305 B1 | 1/2003 | Brannon et al. | | 7,204,311 B2 | 4/2007 | Welton et al. |
| 6,509,301 B1 | 1/2003 | Vollmer et al. | | 7,204,312 B2 | 4/2007 | Roddy et al. |
| 6,527,051 B1 | 3/2003 | Reddy et al. | | 7,205,264 B2 | 4/2007 | Boles |
| 6,554,071 B1 | 4/2003 | Reddy et al. | | 7,216,705 B2 | 5/2007 | Saini et al. |
| 6,566,310 B2 | 5/2003 | Chan | | 7,219,731 B2 | 5/2007 | Sullivan |
| 6,569,814 B1 | 5/2003 | Brady et al. | | 7,228,904 B2 | 6/2007 | Todd et al. |
| 6,578,630 B2 | 6/2003 | Simpson et al. | | 7,261,156 B2 | 8/2007 | Nguyen et al. |
| 6,599,863 B1 | 7/2003 | Palmer et al. | | 7,264,051 B2 | 9/2007 | Nguyen et al. |
| 6,667,279 B1 | 12/2003 | Hessert et al. | | 7,265,079 B2 | 9/2007 | Willbert et al. |
| 6,669,771 B2 | 12/2003 | Tokiwa et al. | | 7,267,170 B2 | 9/2007 | Mang et al. |
| 6,681,856 B1 | 1/2004 | Chatterji et al. | | 7,276,466 B2 | 10/2007 | Todd et al. |
| 6,686,328 B1 | 2/2004 | Binder | | 7,299,869 B2 | 11/2007 | Kalman |
| 6,691,780 B2 | 2/2004 | Nguyen et al. | | 7,303,014 B2 | 12/2007 | Reddy et al. |
| 6,702,023 B1 | 3/2004 | Harris et al. | | 7,306,037 B2 | 12/2007 | Nguyen et al. |
| 6,710,019 B1 | 3/2004 | Sawdon et al. | | 7,322,412 B2 | 1/2008 | Badalamenti et al. |
| 6,716,797 B2 | 4/2004 | Brookey | | 2001/0016562 A1 | 8/2001 | Muir et al. |
| 6,737,385 B2 | 5/2004 | Todd et al. | | 2002/0119169 A1 | 8/2002 | Angel et al. |
| 6,761,218 B2 | 7/2004 | Nguyen et al. | | 2003/0054962 A1 | 3/2003 | England et al. |
| 6,763,888 B1 | 7/2004 | Harris et al. | | 2003/0130133 A1 | 7/2003 | Vollmer |
| 6,764,981 B1 | 7/2004 | Eoff et al. | | 2003/0147965 A1 | 8/2003 | Basset et al. |
| 6,793,018 B2 | 9/2004 | Dawson et al. | | 2003/0230407 A1 | 12/2003 | Vijn et al. |
| 6,793,730 B2 | 9/2004 | Reddy et al. | | 2004/0014606 A1 | 1/2004 | Parlar et al. |
| 6,806,235 B1 | 10/2004 | Mueller et al. | | 2004/0070093 A1 | 4/2004 | Mathiowitz et al. |
| 6,817,414 B2 | 11/2004 | Lee | | 2004/0099416 A1 | 5/2004 | Vijn et al. |
| 6,818,594 B1 | 11/2004 | Freeman et al. | | 2004/0138068 A1 | 7/2004 | Rimmer et al. |
| 6,837,309 B2 | 1/2005 | Boney et al. | | 2004/0152601 A1* | 8/2004 | Still et al. .................. 507/100 |
| 6,840,318 B2 | 1/2005 | Lee et al. | | 2004/0170836 A1 | 9/2004 | Bond et al. |
| 6,852,173 B2 | 2/2005 | Banerjee et al. | | 2004/0231845 A1 | 11/2004 | Cooke, Jr. |
| 6,861,394 B2 | 3/2005 | Ballard et al. | | 2004/0259738 A1 | 12/2004 | Patel |
| 6,877,563 B2 | 4/2005 | Todd et al. ............... 166/312 | | 2004/0261996 A1 | 12/2004 | Munoz, Jr. et al. .......... 166/279 |
| 6,883,608 B2 | 4/2005 | Parlar et al. | | 2005/0028976 A1 | 2/2005 | Nguyen |
| 6,886,635 B2 | 5/2005 | Hossaini et al. | | 2005/0034861 A1 | 2/2005 | Saini et al. |
| 6,896,058 B2 | 5/2005 | Munoz, Jr. et al. | | 2005/0059556 A1 | 3/2005 | Munoz, Jr. et al. |
| 6,904,971 B2 | 6/2005 | Brothers et al. | | 2005/0059557 A1 | 3/2005 | Todd et al. |
| 6,949,491 B2 | 9/2005 | Cooke, Jr. | | 2005/0059558 A1 | 3/2005 | Blauch et al. |
| 6,959,767 B2 | 11/2005 | Horton et al. | | 2005/0126785 A1 | 6/2005 | Todd et al. |
| 6,978,838 B2 | 12/2005 | Parlar et al. | | 2005/0130848 A1 | 6/2005 | Todd et al. |
| 6,981,552 B2 | 1/2006 | Reddy et al. | | 2005/0183741 A1 | 8/2005 | Surjaatmadja et al. |
| 6,983,801 B2 | 1/2006 | Dawson et al. | | 2005/0205266 A1 | 9/2005 | Todd et al. |
| 6,987,083 B2 | 1/2006 | Phillippi et al. | | 2005/0272613 A1 | 12/2005 | Cooke, Jr. |
| 6,997,259 B2 | 2/2006 | Nguyen | | 2005/0277554 A1 | 12/2005 | Blauch et al. |
| 7,000,701 B2 | 2/2006 | Todd et al. | | 2006/0016596 A1 | 1/2006 | Pauls et al. |
| 7,007,752 B2 | 3/2006 | Reddy et al. | | 2006/0032633 A1 | 2/2006 | Nguyen |
| 7,021,377 B2 | 4/2006 | Todd et al. | | 2006/0046938 A1 | 3/2006 | Harris et al. |
| 7,021,383 B2 | 4/2006 | Todd et al. ............... 166/307 | | 2006/0065397 A1 | 3/2006 | Nguyen et al. |
| 7,032,663 B2 | 4/2006 | Nguyen | | 2006/0105917 A1 | 5/2006 | Munoz, Jr. et al. |
| 7,036,586 B2 | 5/2006 | Roddy et al. | | 2006/0105918 A1 | 5/2006 | Munoz, Jr. et al. |
| 7,036,587 B2 | 5/2006 | Munoz, Jr. et al. | | 2006/0108150 A1 | 5/2006 | Luke et al. |
| 7,044,220 B2 | 5/2006 | Nguyen et al. | | 2006/0118300 A1 | 6/2006 | Welton et al. |
| 7,044,224 B2 | 5/2006 | Nguyen | | 2006/0169182 A1 | 8/2006 | Todd et al. |
| 7,049,272 B2 | 5/2006 | Sinclair et al. | | 2006/0169450 A1 | 8/2006 | Mang et al. |
| 7,063,151 B2 | 6/2006 | Nguyen et al. | | 2006/0172891 A1 | 8/2006 | Todd et al. |
| 7,066,258 B2 | 6/2006 | Justus et al. | | 2006/0172893 A1 | 8/2006 | Todd et al. |
| 7,066,260 B2 | 6/2006 | Sullivan et al. | | 2006/0172894 A1 | 8/2006 | Mang et al. |
| 7,069,994 B2 | 7/2006 | Cooke, Jr. | | 2006/0172895 A1 | 8/2006 | Mang et al. |
| 7,080,688 B2 | 7/2006 | Todd et al. | | 2006/0180310 A1 | 8/2006 | Welton et al. ............... 166/283 |
| 7,093,658 B2 | 8/2006 | Chatterji et al. | | 2006/0185848 A1 | 8/2006 | Surjaatmadja et al. |

| | | | |
|---|---|---|---|
| 2006/0234873 | A1 | 10/2006 | Ballard |
| 2006/0258543 | A1 | 11/2006 | Saini |
| 2006/0258544 | A1 | 11/2006 | Saini |
| 2006/0276345 | A1 | 12/2006 | Todd et al. |
| 2006/0283597 | A1 | 12/2006 | Schreiner et al. |
| 2007/0169938 | A1 | 7/2007 | Moorehead et al. |
| 2007/0173416 | A1 | 7/2007 | Moorehead et al. |
| 2007/0298977 | A1 | 12/2007 | Mang et al. |
| 2008/0009423 | A1 | 1/2008 | Mang et al. |

FOREIGN PATENT DOCUMENTS

| | | |
|---|---|---|
| EP | 0 879 935 | 11/1998 |
| EP | 1 413 710 | 4/2004 |
| FR | 0278540 | 8/1988 |
| GB | 2163790 | 3/1986 |
| GB | 2 412 389 | 3/2004 |
| JP | 2004181820 A | 7/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 00/57022 | 9/2000 |
| WO | WO 01/02698 | 1/2001 |
| WO | WO 01/87797 | 11/2001 |
| WO | WO 01/94744 | 12/2001 |
| WO | WO 02/55843 | 1/2002 |
| WO | WO 02/12674 | 2/2002 |
| WO | WO 03/027431 | 4/2003 |
| WO | WO 2004/007905 | 1/2004 |
| WO | WO 2004/037946 | 5/2004 |
| WO | WO 2004/038176 | 5/2004 |
| WO | WO 2007/008312 | 1/2007 |
| WO | WO 2008/038033 | 4/2008 |

OTHER PUBLICATIONS

Mabey, W., Mill, T. "Critical Review of Hydrolysis of Organic Compounds in Water Under Environmental Conditions," *J. Phys. Chem. Ref. Data*, 7, 383-415, 1978.

Williams, R.J., Gabriel, A.; Andres, R.J., *J. Am. Chem. Soc.*, 50, 1267-1271, 1928.

Todd, B., Funkhouser, G.P., Frost, K., *A Chemical Trigger Useful for Oilfield Applications*, SPE 92709.

Economides, M.J., Nolte, K.G., Ed.'s *Reservoir Stimulation, Schlumberger Education Services*, Houston, Texas, ch. 13, 1987.

Katritzky, A.R., Allin, S.M., *Aquathermolysis: Reactions of Organic Compounds with Superheated Water*, Acc. Chem. Res., 399-406, 1996.

Siskin, M., Brons, G., Katritzky, A.R., Balasubramanian, M.,Aqueous Organic Chemistry, *Aquathermolysis: Comparison With Thermolysis In The Reactivity Of Aliphatic Compounds, Energy & Fuels*, 475-482.

Filachione, E.M., Lengel, J.H., Fisher, C.H., *Preparation of Methyl Lactate*, Ind. Eng. Chem., 37, 388, 1945.

Reid, E.E., *Esterification*, Ind. Eng. Chem., 45, 1954, 1953.

Reid, E.E., *Esterification*, Ind. Eng. Chem., 46, 1801, 1954.

Peterson, M.L., Way, J.W., Carberry, J.J., Reid, E.E., *Esterification*, Ind. Eng. Chem., 52, 1960.

Tarkow, H., Stamm, A.J., *The Reaction of Formic Acid with Carbohydrates. I. The Reaction of Formic Acid with Sugars*, J. Phys. Chem., 56, 262, 1952.

Tarkow, H., Stamm, A.J., *The Reaction of Formic Acid with Carbohydrates. II. A New Method for Determining Accessibility*, J. Phys. Chem., 56, 266, 1952.

Malm, C.J., Clarke, H.T., *The Action of Fatty Acides on Cellulose*, J. Am. Chem. Soc., 51, 274, 1929.

Malm, C.J., Barkley, K.T., Schmitt, J.T., May, D.C., *Evaluating Cellulose Reactivity*, Ind. Eng. Chem. Soc., 49, 763, 1957.

Malm, C.J., Glegg, R.E., Salzer, J.T., Ingerick, D.F., Tanghe, L.J., *Hydrolysis of Cellulose Esters*, Ind. Eng. Chem. Proc. Des. Dev., 5, 81, 1966.

Schwach-Adellaoui, K., Heller, J., Gurney, R., *Hydrolysis and Erosion Studies on Autocatalyzed Poly(ortho esters) Containing Lactoyl-Lactyl Acid Dimers*, Macromolecules, 32, 301, 1999.

Sinclair, R.G., *Slow-Release Pesticide System Polymers of Lactic and Glycolic Acids as Ecologically Beneficial, Cost-Effective Encapsulating Materials*, Environmental Science and Technology, 7, 955, 1973.

Kajiyama, T., et al., *Improved Synthesis with High Yield and Increased Molecular Weight of Poly ($\alpha\beta$-malic acid) by Direct Polycondensation*, Biomacromolecules, 5, 169, 2004.

Biehn, G.F., Ernsberger, L. *Polyvinyl Alcohol as an Emulsifying Agent*, Ind. Eng. Chem, 40,. 1449, 1948.

Todd, Brad, Murphy, Rob, *Laboratory Device for Testing of Delayed-Breaker Solutions on Horizontal Wellbore Filter Cakes*, SPE 68968, undated.

Colon, A.A., Vogel, K.H., Warner, J.C., *The Neutral Hydrolysis of Some Alkyl Lactates*, J. Am. Chem. Soc. 75, 6074, 1953.

Stefanidis, D., Jencks, W.P., *General Base Catalysis of Ester Hydrolysis*, J. Am. Chem. Soc., 115, 6045, 1993.

Skrabal, A., *Trans. Faraday Soc.*, 24, 687, 1928.

Wolf, I.A., Olds, D.W., Hilbert, G.E., *Starch Formate*, J. Am. Chem, Soc., 79, 3860, 1957.

Whistler, R.L., Roberts, H.J., *Distribution of Formyl Groups in Amylose Monoformate*, J. Am. Chem. Soc., 81, 4427, 1959.

Woodbridge, R.G., Jr., "Notes on Cellulose Esters", J. Am. Chem. Soc., 31, 1067, 1909.

Myers, R.T., Collett, A.R., Lazzell, C.L., *The Rate of Saponification of Acetates of Unsaturated Alcohols*, J. Phys. Chem., 56, 461, 1952.

Kellogg, D.R., *The Effect of Neutral Salts on Hydrolysis by Water*, J. Am. Chem. Soc., 31, 403, 1909.

Kellogg, D.R., *The Effect of Neutral Salts on Hydrolysis by Water*, J. Am. Chem. Soc., 31, 886, 1909.

Holland, J.M., Miller, J.G., *Hydrolysis of Alkyl Acetates in a Phosphate-Buffered Medium*, J. Phys. Chem., 65, 463, 1961.

Purac America: MSDS Rev., Apr. 8, 2005.

Bowmer, C.T., Hooftman, A.O., Hansveit, A.O., Vanderbosch, P.W. M., van der Hoeven, N., "The Ecotoxicity and the Biodegradability of Lactic Acid, AlkylLactate Esters and Lactate Salts," Chemosphere, 37, 76, 1317-33, 1998.

Chatterji, J, Borchardt, J.K.: "Application of Water-Soluble Polymers in the Oilfield," paper SPE 9288 presented at the 1980 Annual Technical Conference, Dallas, TX, Sep. 21-24, 1980.

Norman, L.R., Conway, M.W., Wilson, J.M.; "Temperature-Stable Acid Gelling Polymers: Laboratory Evaluation and Field Results," paper SPE 10260 presented at the 1981 Annual Technical Conference, San Antonio, TX, Oct. 5-7, 1981.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac[SM] Service, A Quick and Cost-Effective Method to Help Boost Production From Openhole Horizontal Completions*, Halliburton Communications, HO3297, 2002.

Halliburton, *Cobra Frac[SM] Service, Coiled Tubing Fracturing—Cost-Effective Method for Stimulating Untapped Reserves*, HO2319R, Halliburton Energy Services, 2000.

Halliburton, *CobraJet Frac[SM] Service, Cost-effective Technology That Can Help Reduce Cost Per BOE Produced, Shorten Cycle Time and Reduce Capex*, Halliburton Communications.

Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.

Skrabal et al, *The Hydrolysis Rate Of Orthoformic Acid Ethyl Ether*, Chemical Institute of the University of Graz, Jan. 13, 1921, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., *Release of BSA from poly(ortho ester) extruded thin strands* Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-August, 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

Foreign Search Report from Related Counterpart Application dated Mar. 13, 2008.

\* cited by examiner

METHODS AND COMPOSITIONS RELATING TO THE CONTROL OF THE RATES OF ACID-GENERATING COMPOUNDS IN ACIDIZING OPERATIONS

BACKGROUND

The present invention relates to methods of acidizing subterranean formations or well bores, and more specifically, to acidizing systems involving acid-generating fluids that comprise acid-generating compounds that generate acids, and associated methods. More particularly, the present invention relates to controlling the generation rate of the acid from the acid-generating compound.

Acidizing and fracturing treatments using aqueous acidic solutions commonly are carried out in subterranean formations (including those that contain hydrocarbons as well as those that do not) penetrated by well bores to accomplish a number of purposes, one of which is to increase the permeability of the formation. The resultant increase in formation permeability normally results in an increase in the recovery of hydrocarbons from the formation.

Acidizing techniques can be carried out as "matrix acidizing" procedures or as "acid fracturing" procedures. Generally, in acidizing treatments, aqueous acidic solutions are introduced into the subterranean formation under pressure so that the acidic solution flows into the pore spaces of the formation to remove near-well formation damage and other damaging substances. The acidic solution reacts with acid-soluble materials contained in the formation which results in an increase in the size of the pore spaces and an increase in the permeability of the formation. This procedure commonly enhances production by increasing the effective well radius. When performed at pressures above the pressure required to fracture the formation, the procedure is often referred to as acid fracturing. Fracture-acidizing involves the formation of one or more fractures in the formation and the introduction of an aqueous acidizing fluid into the fractures to etch the fractures' faces whereby flow channels are formed when the fractures close. The aqueous acidizing fluid also enlarges the pore spaces in the fracture faces and in the formation. In fracture-acidizing treatments, one or more fractures are produced in the formation and the acidic solution is introduced into the fracture to etch flow channels in the fracture face. The acid also enlarges the pore spaces in the fracture face and in the formation. The use of the term "acidizing" herein refers to both types of acidizing treatments, and more specifically, refers to the general process of introducing an acid down hole to perform a desired function, e.g., to acidize a portion of a subterranean formation or any damage contained therein.

Although acidizing a portion of a subterranean formation can be very beneficial in terms of permeability, conventional acidizing systems have significant drawbacks. One major problem associated with conventional acidizing treatment systems is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid strength, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain mineral acids, organic acids of suitable strength, hydrochloric acid or a mixture of hydrofluoric and hydrochloric acids, have high acid strength and quickly react with the formation itself, fines and damage nearest the well bore, and do not penetrate the formation to a desirable degree before becoming spent. To achieve optimal results, it is desirable to maintain the acidic solution in a reactive condition for as long a period of time as possible to maximize the degree of penetration so that the permeability enhancement produced by the acidic solution may be increased.

Another problem associated with acidizing subterranean formations is the corrosion caused by the acidic solution to any metal goods (such as tubular goods) in the well bore and the other equipment used to carry out the treatment. For instance, conventional acidizing fluids, such as those that contain organic acids, hydrochloric acid or a mixture of hydrofluoric and hydrochloric acids, have a tendency to corrode tubing, casing and down hole equipment, such as gravel pack screens and down hole pumps, especially at elevated temperatures. The expense of repairing or replacing corrosion damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. The partial neutralization of the acid results in the production of quantities of metal ions which are highly undesirable in the subterranean formation.

Another problem associated with conventional acidizing systems is that they can pose handling and/or safety concerns due to the reactivity of the acid. For instance, during a conventional acidizing operation, corrosive fumes may be released from the acid as it is injected down the well bore. The fumes can cause an irritation hazard to nearby personnel, and a corrosive hazard to surface equipment used to carry out the operation.

To combat these problems, acid-generating compounds have been contemplated for use in acidizing fluids. In this way, a live acid is not used. Rather, the acid is delayedly generated downhole for use in these and other various applications. Although such approaches may be beneficial, they may still have some drawbacks in that the delay achieved by using the acid-generating compound may not be optimized. Moreover, there is a need to accurately control the hydrolysis time of the acid-generating compound to be able to get the acid to the portion of the subterranean formation in which it is needed. Some of the acid-generating compounds contemplated, such as diethylene glycol diformate, may generate an acid too fast for placement. Others, such as ethyl lactate, may generate an acid too slow. The particular reaction rate depends on the particular acid-generating compound, the temperature of application, and the concentration of the acid-generating compound. Of the preceding criteria, only the concentration of the acid-generating compound is easily controlled, and its effect is very minor compared to the other two criteria. What is needed is an additional means to control the generation of the acid so that it the generated acid can be used as desired in a subterranean formation.

Additionally, when using/making completion fluids, the choice of what brine to use is dictated by the overall weight of the fluid. However, optimally, the choice of brine also should be guided by the effect it may have on an acid-generating compound in the brine in order to achieve the desired reaction rate for the acid-generating compound so that the desired acidizing effect is achieved.

SUMMARY

The present invention relates to methods of acidizing subterranean formations or well bores, and more specifically, to acidizing systems involving acid-generating fluids that comprise acid-generating compounds that generate acids, and associated methods. More particularly, the present invention relates to controlling the generation rate of the acid from the acid-generating compound.

In one embodiment, the present invention provides a method comprising: providing an acid-generating fluid that comprises an acid-generating compound, a base fluid, and a salt; placing the acid-generating fluid in a well bore penetrating a subterranean formation; allowing the salt to affect the hydrolysis of the acid-generating compound; and allowing the acid-generating compound to produce an acid that then acidizes at least a portion of the formation or damage contained therein.

In one embodiment, the present invention provides a method comprising: providing an acid-generating fluid that comprises an acid-generating compound, a base fluid, and a salt; placing the acid-generating fluid in a well bore penetrating a subterranean formation at a pressure sufficient to create or enhance a fracture in the subterranean formation; and allowing the salt to affect the hydrolysis of the acid-generating compound so as to accelerate it or retard it.

In one embodiment, the present invention provides a method comprising: providing an acid-generating fluid that comprises an acid-generating compound, a base fluid, and a salt; placing the acid-generating fluid into a subterranean formation; allowing the salt to affect the hydrolysis of the acid-generating compound; and allowing an acid to generate from the acid-generating fluid.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
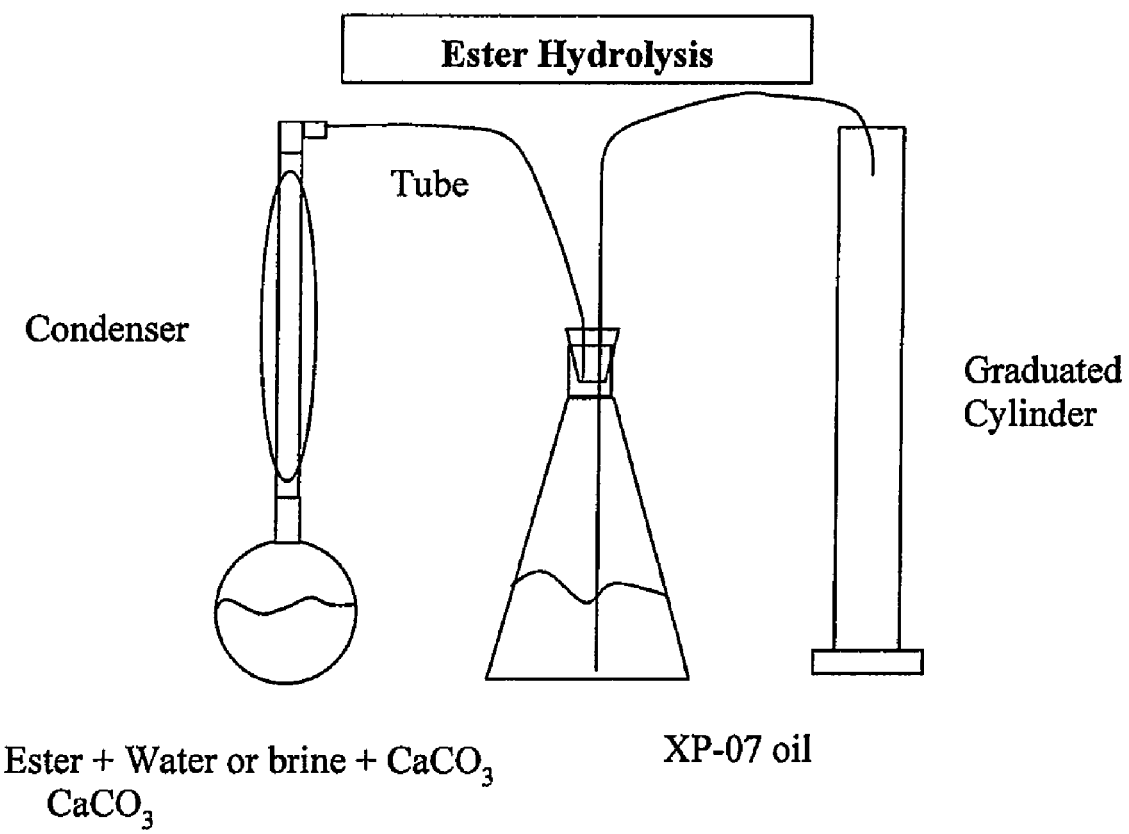
FIG. 1 is a representational diagram of a closed system reactor.

The present invention relates to methods of acidizing subterranean formations or well bores, and more specifically, to acidizing systems involving acid-generating fluids that comprise acid-generating compounds that generate acids, and associated methods. More particularly, the present invention relates to controlling the generation rate of the acid from the acid-generating compound. These acid-generating compounds hydrolyze downhole to form acids that are then used in any suitable acidizing treatment to acidize a portion of a subterranean formation or any damage contained therein. The term "damage" as used herein refers to undesirable deposits in a subterranean formation that may reduce its permeability. Scale, skin, and hydrates are contemplated by this term. Also contemplated by this term are geological deposits, such as but not limited to, carbonates located on the pore throats of the sandstone in a subterranean formation. They may also be used to degrade a filter cake.

In no way is this paragraph to be considered an exhaustive discussion of certain aspects or advantages of the invention. One of the many advantages of the present invention is that it enables the control of the hydrolysis of the acid-generating compound so that the generated acid can be placed in the desired portion of the subterranean formation to perform the desired treatment. Also, the acidizing systems of the present invention should be much less corrosive to tubing, casing, and other down hole equipment than conventional systems, and may achieve deeper penetration into the subterranean formation from the well bore as well as more uniform placement of acid in the well bore. For instance, one may be able to soak an entire interval relatively evenly as opposed to spot placement of strong acids. Also, delayed acid generation should allow for the removal of the placement equipment before the acidizing, allowing the well to be shut in, resulting in a more complete acidization without well control dangers. Additionally, the present invention should permit corrosion considerations to not be a limiting factor in the design of these acidizing systems. Also, the systems should present little or no acid handling concerns for personnel and equipment. These systems may allow for the pumping of more concentrated acids in some embodiments, especially as compared to typical inorganic acid systems. Also, longer effective fracture acidizing lengths should be realized at least in most embodiments. Another benefit may be that leak off may be less as compared to conventional acidic fluids. One of the more important benefits should be that deeper penetration of the acid into the subterranean formation should be obtained. Additionally, in certain embodiments, the acidizing systems of the present invention should effectively generate wormholes to stimulate production in subterranean carbonate formations, dissolve damage, and remove fines to recover production in formations at elevated temperatures.

The acid-generating fluids of the present invention comprise a base fluid, a chosen salt, and an acid-generating compound. Optionally, they may comprise additional components if desired. If desired, the acid-generating fluids also may comprise gelling agents, diverting agents, nonemulsifiers, other acids, cross linking agents, and/or mutual solvents. Combinations and derivatives of these also may be suitable. Although some fluid loss control agents may be used if needed, in the fluids of the present invention there should be less need for fluid loss control because the fluids are not involved in a relatively fast reaction at the edge of well bore. This may be application dependent. Any fluid loss may affect the ability to create longer fractures. Any sort of proppant particulates may be included if desired as well.

The chosen salt is an important component of the acid-generating fluids of the present invention because depending on which salt is chosen, the hydrolysis rate of the acid-generating compound can either be enhanced or retarded. It is believed that the salt controls the availability of the water, at least to some extent, for reaction with the acid-generating component. Depending on the particular application to which a fluid will be used, this enhancement or retardation may be desirable. Thus, it is important to recognize that some salts have different effects on this hydrolysis. Salts that tend to enhance the rate of the hydrolysis reaction may be referred to herein as "reaction rate accelerating salts." Salts that tend to retard the rate of the hydrolysis reaction may be referred to herein as "reaction rate retarding salts." The overall affect, however, of either type of salt of the hydrolysis of the acid-generating compound is a function of the concentration of the salt relative to the concentration of the acid-generating compound. In general, a stronger effect may be seen at higher relative concentrations of the salt. Temperature (e.g., the temperature of the subterranean formation in which the fluid will be used) should play an important role, inter alia, because it generally affects the hydrolysis rate of the acid-generating compound. In certain embodiments, the amount of salt that should be used may range from 0.1% up to the saturation point. The amount used should depend on how much rate acceleration or rate deceleration of the base acid-generating compound is desired. (If only small changes are desired, small amounts of specific salt, maybe 1%, for larger changes, more specific salt, indeed up to saturation.) One of ordinary skill in the art with the benefit of this disclosure will be able to determine an appropriate amount of salt to use to achieve a desired objective with respect to the deceleration or acceleration of the reaction. The amount used may be limited by the desired weight of the fluid. For instance, it may not be advisable to add more salt to accelerate the reaction if that would exceed the weight limitations of the fluid. Experimental trial and error may be helpful in determining the optimal amount of salt needed to achieve the desired effect in a particular application.

Examples of reaction rate accelerating salts that may be suitable for use in the present invention include formate salts. Examples of reaction rate retarding salts that may be suitable for use in the present invention include sodium bromide salts.

The acid-generating compound(s) in the acid-generating fluids of the present invention may be chosen from the group consisting of any esters and formates that are water soluble or partially soluble. Particularly suitable acid-generating compounds for use in the present invention include lactic acid derivatives, methyl lactate, ethyl lactate, propyl lactate, butyl lactate. Other suitable acid-generating compounds include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate may be preferred. Examples of suitable esters also include esters or polyesters of glycerol including, but not limited to, tripropionin (a tri-ester of propionic acid and glycerol), trilactin, and esters of acetic acid and glycerol such as monoacetin, diacetin, and triacetin. Optionally, the acid-generating compound(s) may include esters; aliphatic polyesters; poly(lactides); poly(glycolides); poly($\epsilon$-caprolactones); poly(hydroxybutyrates); poly(anhydrides); aliphatic polycarbonates; poly(amino acids); and polyphosphazenes; or copolymers thereof. Derivatives and combinations also may be suitable. Various combinations of the esters or polyesters of hydroxy acid and/or glycerol also may be employed to adjust the half-life of the hydrolysis reactions. Other suitable materials may be disclosed in U.S. Pat. Nos. 6,877,563 and 7,021,383, the disclosures of which are incorporated by reference. Most of these are commercially available in liquid form, and therefore, may be used in that form with or without a base fluid to achieve certain objects of the present invention. Preferably, they are used in this liquid form. However, solid forms of these acid-generating compounds may be used beneficially in the methods of the present invention. They may be useful because they are nondamaging, and may enhance the acidizing treatment. These acid-generating compounds will generate an acid down hole in a delayed fashion that will then acidize the formation. The acid-generating compounds may be reacted with small amounts of reactive materials such as mineral acids, organic acids, acidic anhydrides, p-toluenesulfonic acid, etc. to lower the pH to accelerate the hydrolysis of the acid-generating compound. Similarly, the hydrolysis rate may be accelerated by the addition of a small amount of a strong base such as NaOH, $Na_2CO_3$, and $Mg(OH)_2$, however, the resultant acid may be neutralized by the presence of base. An acid may have a similar effect. The acid-generating compound also may generate alcohols downhole that may be beneficial to the operation.

Ethyl lactate may be considered a particularly good lactate ester due to its ability to hydrolyze over the wide temperature range of from about 60° C. to about 150° C., with its half-life being particularly useful at temperatures ranging from about 80° C. to about 140° C. Further, ethyl lactate may be relatively inexpensive, and widely available.

The concentration of the acid-generating compound in the acid-generating fluids of the present invention may range from about 1% to about 100% based on weight. The particular concentration used in any particular embodiment depends on what acid-generating compound is being used, and what percentage of acid is generated. Other complex, interrelated factors that may be considered in deciding how much of the acid-generating compound to use include, but are not limited to, the composition of the formation, the temperature of the formation, the pressure of the formation, the particular fines and damage present in the formation (e.g., scale, skin, calcium carbonate, silicates, and the like), the particular acid-generating compound used, the expected contact time of the generated acid with the formation, etc. The desired contact time also depends on the particular application and purpose. For example, if very delayed acidizing is desired, then it may be desirable to pump a dilute, low concentration but a high volume to get deeper penetration. For matrix stimulation treatments, the expected contact time may be determined from the maximum pumping rate that does not cause the down hole pressure to exceed the fracturing pressure. For damage or fines removal procedures, the expected contact time may be based on laboratory tests, but usually should allow for extended contact periods as compared to conventional acid treatments. For instance, in conventional treatments where a live acid is pumped to remove scale or fines, that acid may react instantaneously so clean up of the entire amount of damage and fines may be impossible. Possibly, to achieve an equivalent of a 15% HCl acidizing treatment, it may be desirable to run formates and acetates mixtures, depending on which ones are chosen with an eye toward how resulting salts will be produced in the formation since salts can precipitate in the formation. To avoid undesirable salt precipitation problems, it may be desirable to combine formates and acetates or lactates to keep both below the over saturation concentration that would cause salts to precipitate in formation, but still achieve the acid potential and dissolving power necessary for the job. To choose the appropriate acid-generating compound and the right concentration of that compound, one should balance salt precipitation and acid dissolving power concentration concerns. In some embodiments, a combination of acetic acid and formic or a combination of acetic acid and lactic acid may be preferred over a combination of acetic acid and formic acid and lactic acid. One of ordinary skill in the art with the benefit of this disclosure should know how to balance the factors so that salts do not saturate.

In some embodiments, the acid-generating fluids of the present invention may include one or more other types of esters for adjusting the half-life of the hydrolysis reaction. The term "half-life" as used herein refers to the time it takes for half of the original amount of the acid-generating compound to react. For example, diethyleneglycol diformate may be employed in a treatment composition along with an acid-generating compound of a hydroxy acid or of a glycerol to reduce the half-life thereof. The diethyleneglycol diformate therefore could be used to shorten the completion time of the well. It forms formic acid as a result of hydrolysis, and is commercially available from Halliburton Energy Services, Inc., under the tradename "BDF-325." Examples of other esters with the esters or polyesters described herein may be combine with include, but are not limited to, diethylenegly-colmonoformate, monoethyleneglycoldiformate, monoethyleneglycolmonoformate, and derivatives and combinations thereof. Similarly, other esters may be added in conjunction with the esters or polyesters described herein. Faster hydrolysis rates may result.

TABLE 1

| Ester | Half-Life in Neutral Water at 100° C. (seconds) | Pseudo First Order Rate Constant (sec.$^{-1}$) |
|---|---|---|
| Triacetin | 9840 | $7.04 \times 10^{-5}$ |
| Diacetin | 14600 | $4.75 \times 10^{-5}$ |
| Monoacetin | 38400 | $1.8 \times 10^{-5}$ |
| Tripropionin | 32344.83 | $1.05 \times 10^{-5}$ |
| Methyl lactate | 9746.19 | $2.1 \times 10^{-5}$ |
| Ethyl lactate | 31363.63 | $2.2 \times 10^{-5}$ |
| Propyl lactate | 93033.7 | $7.4 \times 10^{-5}$ |
| Butyl lactate | 76704.55 | $9.03 \times 10^{-5}$ |

Based on Table 1, the half-lives of such esters at relatively high temperatures are longer than that of other known acidization esters, e.g., diethyleneglycol diformate. For example, the half-life of ethyl lactate may be about 10-11 hours, whereas the half-life of diethyleneglycol diformate may be about only 18-20 minutes in neutral water at 100° C. Thus, the reaction of such esters with water proceeds at a slower rate, allowing the acid-generating fluid to be diverted throughout the entire targeted region. The addition of a specific salt can further extend that half-life if desired.

The base fluid may be either aqueous-based or oil-based. Preferred base fluids are aqueous-based. Oil-based fluids may be useful in water sensitive formations or for providing an organic acid downhole. If an oil-based fluid is used, to enable the hydrolysis of the acid-generating compound water should be present in some way, for example, in the well bore or otherwise available. A base fluid may be beneficially used, for example, to provide dilution to control concentration or coverage issues. One of ordinary skill in the art with the benefit of this disclosure will recognize when a base fluid may be beneficial. The base fluid should be chosen based on its compatibility with the formation and the acid-generating compound. Some acid-generating compounds are water soluble and some or oil soluble.

Optionally, the acid-generating fluids of the present invention may comprise a gelling agent. In deciding whether to use a gelling agent and which kind to use one should consider at least these factors: the formation temperature, the length of treatment design (time-wise), the desired break mechanism of gelling agent; and the purpose for which the gelling agent has been included in the fluid. One should note that the acid-generating compound may have its own sufficient viscosity or at least some viscosity that should be taken into account when formulating the fluid. It could be the case that the acid-generating compound and the gelling agent could work synergistically, e.g., the generated formate or methanol could stabilize polymers in general, which may be beneficial because the acid may destabilize.

Any gelling agent suitable for use in subterranean applications may be used in these fluids, including, but not limited to, natural biopolymers, synthetic polymers, cross linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, mixtures thereof, and the like. Examples may be shown in these references, the disclosures of which are incorporated herein by reference, Chatterji, J. and Borchardt, J. K.: "Application of Water-Soluble Polymers in the Oilfield," paper SPE 9288 presented at the 1980 Annual Technical Conference, Dallas, Tex., September 21-24; Norman, L. R., Conway, M. W., and Wilson, J. M.: "Temperature-Stable Acid Gelling Polymers: Laboratory Evaluation and Field Results," paper SPE 10260 presented at the 1981 Annual Technical Conference, San Antonio, Tex., October 5-7; Bouwmeester, Ron, C. M. US Patent Application 2005/0197257; Tackett, Jr., U.S. Pat. No. 5,082,056; Crowe, Curtis, W. European Patent Application 0 278 540; and Nehmer, Warren L GB 2163790. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. If used, a gelling agent may be present in the acid-generating fluids of the present invention in an amount in the range of from about 0.01% to about 5% by weight of the base fluid therein.

To combat possible perceived problems associated with polymeric gelling agents, some surfactants have been used as gelling agents. It is well understood that, when mixed with a fluid in a concentration above the critical micelle concentration, the molecules (or ions) of surfactants may associate to form micelles. These micelles may function, among other purposes, to stabilize emulsions, break emulsions, stabilize a foam, change the wetability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. Moreover, because the viscosifying micelles may be sensitive to pH and hydrocarbons, the viscosity of these viscoelastic surfactant fluids may be reduced after introduction into the subterranean formation without the need for certain types of gel breakers (e.g., oxidizers). A particular surfactant that may be useful is a methyl ester sulfonate ("MES") surfactant. Suitable MES surfactants are disclosed in patent application Ser. No. 11/058,660, the disclosure of which is incorporated by reference. This may allow a substantial portion of the viscoelastic surfactant fluids to be produced back from the formation without the need for expensive remedial treatments. If used, these surfactants may be used in an amount of up to about 10% by weight of the base fluid therein.

While optional, at least a portion of the gelling agent included in the fluids of the present invention may be cross linked by a reaction comprising a cross linking agent, e.g., to further increase the treatment fluid's viscosity thereof. Cross linking agents typically comprise at least one metal ion that is capable of cross linking gelling agent molecules. Really there is an unlimited number of cross linking agents that may be suitable because the compositions of the present invention are not limited by ligand choice on the cross linking agent. Examples of suitable cross linking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum lactate or aluminum citrate); borate compounds (such as, for example, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based cross linking agent is "CL-24™" cross linker from Halliburton Energy Services, Inc., Duncan, Okla. An example of a suitable commercially available titanium-based cross linking agent is "CL-39™" cross linker from Halliburton Energy Services, Inc., Duncan Okla. An example of a suitable borate-based cross linking agent is commercially available as "CL-22™" delayed borate cross linker from Halliburton Energy Services, Inc., Duncan, Okla. Divalent ions also may be used; for example, calcium chloride and magnesium oxide. An example of a suitable divalent ion cross linking agent is commercially available as "CL-30™" from Halliburton Energy Services, Inc., Duncan, Okla. Another example of a suitable cross linking agent is "CL-15," from Halliburton Energy Services, Inc., Duncan Okla. Where present, the cross linking agent generally should be included in the fluids of the present invention in an amount sufficient, among other things, to provide the desired degree of cross linking. In some embodiments, the cross linking agent may be present in the treatment fluids of the present invention in an amount in the range of from about 0.01% to about 5% by weight of the treatment fluid. Buffering compounds may be used if desired, e.g., to delay or control the cross linking reaction. These may include glycolic acid, carbonates, bicarbonates, acetates, phosphates, and any other suitable buffering agent.

One should note that if a gelling agent (especially a cross linked gelling agent) is used, a suitable breaker may be advisable depending on the gelling agent and its interaction with the acid-generating compound, the generated acid, and the well bore conditions. A breaker may be advisable to ultimately reduce the viscosity of the acid-generating fluid. Any breaker suitable for the subterranean formation and the gelling agent may be used. The amount of a breaker to include will depend, inter alia, on the amount of gelling agent present in the treatment fluid. Other considerations regarding the breaker are known to one skilled in the art with the benefit of this disclosure.

In order to insure that a producing zone is contacted by an acid-generating fluid(s) of the present invention if desired uniformly, a particulate solid diverting agent may be placed in the well bore or the formation to isolate the zone of interest. The term "zone" as used herein simply refers to a portion of the formation and does not imply a particular geological strata or composition. One suitable technique involves packing the diverting agent in perforation tunnels extending from the well bore into the subterranean zone. The diverting agent in the perforation tunnels causes the acid-generating fluid introduced therein to be uniformly distributed between all of the perforations whereby the subterranean zone is uniformly treated. The particulate solid diverting agent should be subsequently removed from the perforation tunnel to allow the maximum flow of produced hydrocarbon from the subterranean zone into the well bore. This can be accomplished by contacting the particulate solid diverting agent with a fluid which degrades the diverting agent, such as, water, oil, xylene and the like. Other chemical diverting agents that are suitable for use in this invention include oil-soluble resins, water-soluble rock salts, and emulsions.

Degradable particulate diverting materials are also suitable for use in the present invention. The degradable particulate diverting materials of this invention can be placed in the subterranean zone or packed into perforation tunnels in the subterranean zone by introducing a carrier fluid containing the degradable particulate diverting materials into the subterranean zone. Preferred degradable particulate diverting materials may comprise a degradable material which is capable of degrading over time when placed in a subterranean zone and will not recrystallize or otherwise solidify down hole. The degradable particular diverting materials may need a source of water to degrade and this may be provided by a particulate hydrated organic or inorganic solid compounds introduced into the subterranean formation either before, during or after the degradable particulate diverting material is introduced. Nonlimiting examples of degradable particulates that may be used in conjunction with the compositions and methods of the present invention include but are not limited to degradable polymers. The term "particulate" as used herein is intended to include material particles having the physical shape of platelets, shavings, flakes, ribbons, rods, strips, spheroids, toroids, pellets, tablets or any other physical shape. The terms "degrade," "degradation," "degradable," and the like when used herein refer to both the two relative cases of hydrolytic degradation that the degradable particulate may undergo, i.e., heterogeneous (or bulk erosion) and homogeneous (or surface erosion), and any stage of degradation in between these two. This degradation can be a result of inter alia, a chemical or thermal reaction or a reaction induced by radiation. Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(e-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Of the suitable aliphatic polyesters, poly(lactide) is preferred. The degradable particulate diverting agents may comprise a plasticizer.

In some embodiments, a self-degradable particulate diverting material which degrades over time may be placed in the subterranean zone. The self-degradable particulate diverting material comprises a mixture of a degradable aliphatic polyester and a hydrated organic or inorganic solid compound. A treating fluid may be introduced into the subterranean zone and then diverted by the self-degradable particulate diverting material therein. Thereafter, the degradable aliphatic polyester in the self-degradable particulate diverting material is allowed to at least partially degrade in the releasable water provided by the hydrated organic or inorganic compound which dehydrates over time when heated in the subterranean zone. Examples of the hydrated organic or inorganic solid compounds that can be utilized in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The specific amount of the hydrated compound that may be included will depend upon the presence of formation water, produced fluids, formation temperature, treating fluid and production rates.

Suitable diverting agents may be provided to the subterranean formation via a carrier fluid that then dissipates into the subterranean zone, and as a result the degradable particulate diverting materials is screened out of the carrier fluid by the formation. A variety of carrier fluids can be utilized including, but not limited to, water, brines, seawater or formation water. Of these, in certain embodiments, brines and seawater are preferred.

If a diverting agent is used, the amount used may range up to 3% or more by weight or volume of the carrier fluid. Preferred diverting agents are disclosed in Halliburton's Published U.S. Patent Application No. 2004-0261996-A1, entitled Methods of Diverting Treating Fluids in Subterranean Zones and Degradable Diverting Materials, filed on Jun. 27, 2003 and published on Dec. 30, 2004, the disclosure of which is incorporated by reference.

Mechanical diverting agents may also be suitable. These may include but are not limited to, perf balls, packers, treatment designs, hydrojetting methods, and methods known as "Surgifrac," which are available from Halliburton Energy Services, at various locations.

In some embodiments, the fluids of the present invention may include surfactants, e.g., to improve the compatibility of the fluids of the present invention with other fluids (like any formation fluids) that may be present in the well bore or reduce interfacial tension. Using surfactants may be advisable when liquid hydrocarbons are present in the well bore. An artisan of ordinary skill with the benefit of this disclosure will be able to identify the type of surfactant as well as the appropriate concentration of surfactant to be used. Suitable surfactants may be used in a liquid or powder form. Where used, the surfactants are present in the fluids in an amount sufficient to prevent incompatibility with formation fluids or well bore fluids. If included, a surfactant may be added in an amount of from about 1/10th of a gal per 1000 gals up to 10% by volume. Higher concentrations may be used, e.g., if a surfactant gelling agent is used, and these amount may be in excess of 5% in some instances. In an embodiment where liquid surfactants are used, the surfactants are generally present in an amount in the range of from about 0.01% to about 10% by volume of a fluid. In one embodiment, the liquid surfactants are present in an amount in the range of from about 0.1% to about 10% by volume of the fluid. In embodiments where powdered surfactants are used, the surfactants may be present in an amount in the range of from about 0.001% to about 10% by weight of the fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant. It should be noted that it may be beneficial to add a surfactant to a viscosified treatment fluid of the present invention as that fluid is being pumped down hole to help eliminate the possibility of foaming if so desired.

In some embodiments, e.g., those that include a surfactant as described above, mutual solvents may be beneficially employed. Mutual solvents may help keep other additives in solution. Suitable mutual solvents include, but are not limited to, Halliburton's MUSOL® Mutual Solvent, MUSOL® A Mutual Solvent, MUSOL® E Mutual Solvent, ethyleneglycolmonobutylether, propyleneglycolmonobutylether, water, methanol, isopropyl alcohol, alcohol ethers, aromatic solvents, other hydrocarbons, mineral oils, paraffins, and derivatives and combinations thereof. Other suitable solvents may also be used. If used, the mutual solvent may be included in an amount of from about 1% to 20% by volume, preferably 5% to 10%.

In some embodiments, the fluids of the present invention may contain bactericides, inter alia, to protect both the subterranean formation as well as the fluid from attack by bacteria. Such attacks may be problematic because they may lower the viscosity of the fluid, resulting in poorer performance, for example. Bacteria also can cause plugging by bacterial slime production, and can turn the formation sour. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilo-propionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in the viscosified treatment fluid in an amount in the range of from about 0.001% to about 0.003% by weight of the viscosified treatment fluid. Another example of a suitable bactericide is a solution of sodium hypochlorite, commercially available under the tradename "CAT-1™" chemical from Halliburton Energy Services, Inc., of Duncan, Okla. In certain embodiments, such bactericides may be present in the viscosified treatment fluid in an amount in the range of from about 0.01% to about 0.1% by volume of the viscosified treatment fluid. In certain preferred embodiments, when bactericides are used in the viscosified treatment fluids of the present invention, they are added to the viscosified treatment fluid before the gelling agent is added.

If desired, the acid-generating fluids of the present invention may be used in the form of an emulsion. Using an emulsion may be beneficial because it would have inherent viscosity that would control fluid loss. Also, depending on external phase, one could control the rate of reaction with the acid soluble materials in the subterranean formation. For instance, if the external phase of the emulsion is a slower hydrolyzing material, the reaction rate could be slower because of depth of penetration or length of diversion. Another potential benefit is that potential corrosion problems (if any) can be managed, especially by using an oil external phase. Additionally, using an emulsion may enable the pumping and placement of more acid overall, especially at higher temperatures. Another possible benefit is that the emulsion may affect the rate at which the acid is generated by the acid-generating component, which may enable one to control that reaction and the overall system design in a beneficial manner. These emulsions are also good for solids transport. Other benefits and advantages to using emulsions in the methods of the present invention will be evident to one of ordinary skill in the art.

The emulsions in the emulsion embodiments can be made with a suitable surfactant or by blending two acid-generating compounds. For instance, an emulsion can be made between two acid-generating compounds if because one is hydrophobic and one is hydrophilic. For instance, poly(orthoesters) are more hydrophobic, and triethylorthoformate is more hydrophilic. Suitable emulsifying surfactants include nonionic surfactants such as sorbitan esters, AF-61™ Emulsifer, and AF-70™ Emulsifier. For oil external surfactants, AF-61™ Emulsifer and AF-70™ Emulsifier, which are available from Halliburton Energy Services in Duncan, Okla., may be preferred. For water external emulsions, SEM-7™ Emulsifier, WS-36™ Dispersant, and WS-44™ Emulsifier may be preferred. These are available from Halliburton Energy Services in Duncan, Okla. If a surfactant is used, generally an amount from about 0.1% to about 3% based on volume is sufficient. In some embodiments, the emulsion can be mixed and then pumped. In other embodiments, the components can be pumped and then mixed down hole.

In some embodiments, the acid-generating fluids of the present invention can be prepared in any suitable tank equipped with suitable mixing means well known to those skilled in the art. The fluids may be transferred either at a controlled rate directly into the well bore or into a convenient storage tank for injection down the well bore. In either event, the pumping rates and pressures utilized will depend upon the characteristics of the formation and whether or not fracturing of the formation is desired. After an acid-generating fluid has been injected into a well bore, the well may be shut in and allowed to stand for a period of several hours or more depending on the type of acid-generating compound employed and the formation treated. If there is pressure in the well, pressure then can be released and then the spent or at least partially spent acid-generating fluid (that likely contains salts formed by the reaction of the acid in the subterranean formation), may be permitted to flow back to the surface for appropriate disposal. The well then can be placed on production or used for other purposes.

The compositions and methods of the present invention may be used in matrix acidizing applications, acidizing applications, fracture acidizing applications, scale removal applications, damage removal applications, hydrate treatment applications, and hydrate inhibition applications. They may also be used in open hole diversion applications. Other purposes may also be applicable including those that involve the generation of an acid and/or an alcohol downhole.

The fluids of the present invention may further comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, corrosion inhibitors, paraffin inhibitors, asphaltene inhibitors, penetrating agents, clay control additives, iron control additives, chelators, reducers, oxygen scavengers, sulfide scavengers, emulsifiers, foamers, gases, derivatives thereof and combinations thereof, and the like.

In some embodiments, the acid-generating fluids of the present invention may be in the form of an emulsion made with a suitable emulsifying agent.

In one embodiment, the present invention provides a method comprising: providing an acid-generating fluid that comprises an acid-generating compound, a base fluid, and a salt, placing the acid-generating fluid in a well bore penetrating a subterranean formation; allowing the salt to affect the hydrolysis of the acid-generating compound; and allowing the acid-generating compound to produce an acid that then acidizes at least a portion of the formation or damage contained therein.

In another embodiment, the present invention provides a method comprising: providing an acid-generating fluid that comprises an acid-generating compound, a base fluid, and a salt; placing the acid-generating fluid in a well bore penetrating a subterranean formation at a pressure sufficient to create or enhance a fracture in the subterranean formation; and allowing the salt to affect the hydrolysis of the acid-generating compound so as to accelerate it or retard it.

The acid-generating fluids of the present invention may be prepared, in certain embodiments, by mixing one or more esters or polyesters as described herein and any other desirable components with the base fluid at the location of the well in which the fluids are to be used. Alternatively, the components may be mixed off-site and transported to the location at which they will be used. If mixed at a location separate from whether the fluids are to be used, one should be mindful of the temperature at which the fluids are kept. Preferably, the should be kept at temperature below which hydrolysis may occur. This may be 40° C. or less, depending on the acid-generating compound.

To facilitate a better understanding of the present invention, the following examples of certain aspects of some embodiments are given. In no way should the following examples be read to limit, or define, the entire scope of the invention.

EXAMPLES

Under suitable conditions, we believe that an ester can be hydrolyzed in water yielding an acid and an alcohol. Scheme 1 shows such a reaction. This example features the hydrolysis of the ester, ethyl lactate:

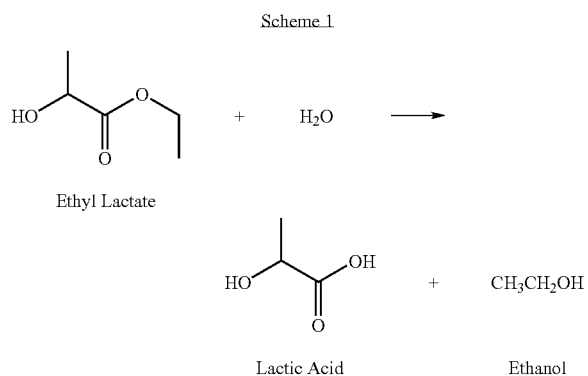

Scheme 1

Ethyl Lactate

Lactic Acid    Ethanol

A rapid screening method was used for the evaluation of ester acidizing candidates. For example, the acid evolved in the reaction depicted in scheme 1 was qualitatively measured per unit of time using an experimental procedure. All hydrolysis reactions were run in the presence of calcium carbonate. The acid generated upon hydrolysis is rapidly consumed in a secondary reaction which produces carbon dioxide. Scheme 2 features the reaction that produces carbon dioxide:

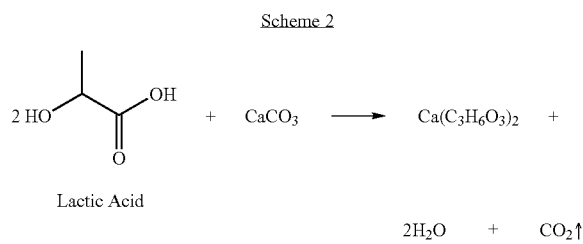

Scheme 2

Lactic Acid

An important factor is the consumption of calcium carbonate. In these experiments, "BARACARB®" bridging agents (that are commercially available from Halliburton Energy Services, Duncan, Okla.) were used as the calcium carbonate source. Generally speaking, at least 50% of all filter cake material is usually comprised of calcium carbonate. The half-life was determined as the time when ½ of the added calcium carbonate was consumed.

We calculated the amount of carbonate that upon reaction with acid would yield 1 liter of $CO_2$ using this equation: $PV=nRT$ $V=nRT/P=$
$[8.2057\times10^{-2}$ L atm $mol^{-1}K^{-1}]$ [0.0447 mol]
[296.5 $KJ$]/1 atm=1.086 L All t½ numbers are based on the rate of calcium carbonate consumption. From the above calculation: 100.09 g/mol $CaCO_3 \times 0.0447$ mol=4.47 grams of $CaCO_3$ to afford 1.086 liters of $CO_2$.

In these experiments, the amount of calcium carbonate (2×4.47 grams=8.94 grams) was doubled so that the half-life of the reaction was calculated based on the yield of 1 liter of carbon dioxide. Unless otherwise specified, all half-life quotations in these experiments are actually the time required for 4.47 grams of calcium carbonate to be consumed.

A closed system reactor was used for these hydrolysis reactions to measure the evolution of $CO_2$ gas. FIG. 1 is a diagram of the apparatus. The general procedure follows.

Figure 2:
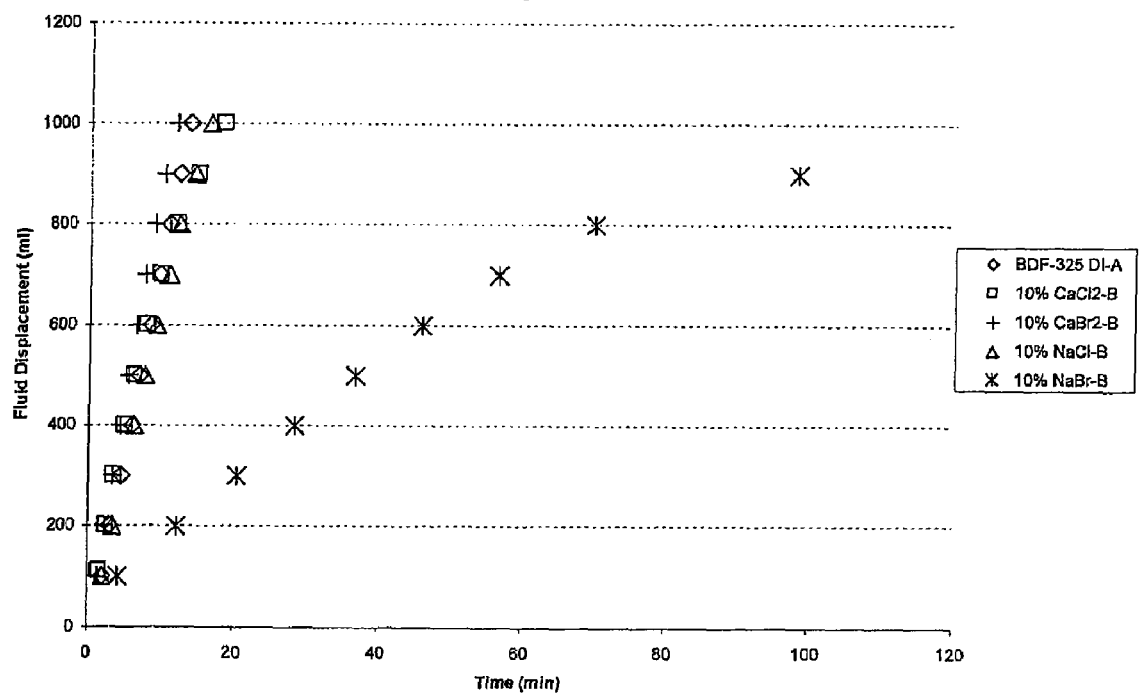
FIG. 2 is a graph of data discussed in the Examples section.

Water or brine was added to a flask along with 8.94 grams of calcium carbonate, which was heated in the desired temperature range. The vast majority of the experiments were carried out in boiling water or brine at about 100° C. Once the liquid was at the desired temperature, a predetermined amount of a chosen ester was added. The calcium carbonate was insoluble, and therefore, resided at the bottom of the boiling liquid in the flask. The ester was added in ratio to the water (w/v; ester/water), or to the make-up water used to formulate the brine, except where commercially available brines were used. Following the addition of the ester to the boiling liquid, a reflux condenser was affixed to the flask. The top of the condenser was fixed with an adaptor. Tubing connected the adapter to an inlet tube in a 2-hole rubber stopper. The inlet tube passes through the stopper, which provided a seal. The tip of the outlet tube resided at the bottom of the flask. The flask was charged with at least 1100 ml of "XP-07" base oil, which is a mineral oil available from Halliburton Energy Services, at multiple locations. The outlet tube was fitted with tubing for the purpose of discharging oil into a 1000 ml graduated cylinder. The hydrolysis reaction produced acid. The acid reacted with the carbonate to produce carbon dioxide. The produced gas displaced the oil in the flask and into the graduated cylinder. Thus, the rate of $CO_2$ evolution could be monitored visually by noting readings of the amount of oil in the graduated cylinder per unit of time. FIG. 2 shows a 10% diethyleneglycol diformate hydrolysis at about 100° C. Among other things, note the different reaction velocity in NaBr brine relative to the reaction velocity in other brines. The kinetics in water and the 10% brines are all consistent with the exception of the reaction carried out in 10% NaBr brine.

In these experiments, the behavior of all esters appeared to be consistent with the example illustrated in FIG. 2. That is, NaBr brines appear to retard the rate of hydrolysis of esters relative to that carried out using neutral water or to ester hydrolysis in other brines.

Figure 3:
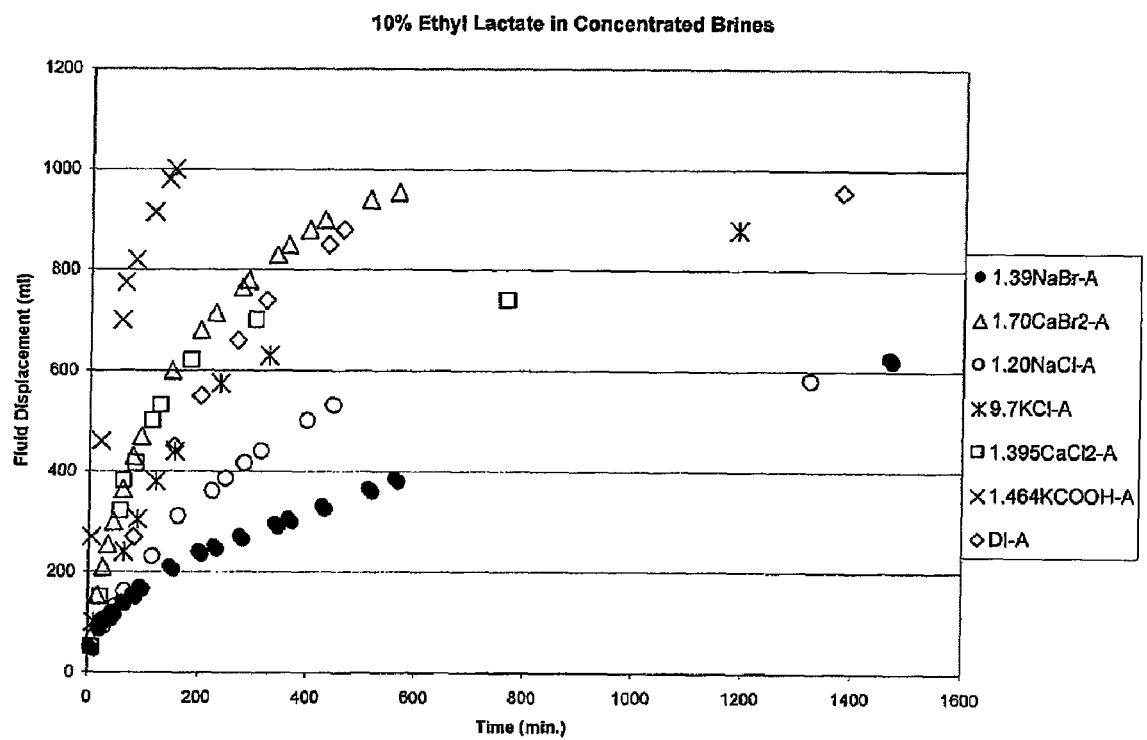
FIG. 3 is a graph of data discussed in the Examples section.

FIG. 3 illustrates the result of hydrolysis reactions of 10% ethyl lactate in water (DI-A) and in an array of concentrated brines. A 1:1 molar ratio of ester to carbonate was used in water and with an array of concentrated brines. With respect to the other esters featured in FIG. 3, ethyl lactate displays the best performance. The hydrolysis rates in water and the respective concentrated brines seem to be individual. FIG. 3 appears to contain evidence of smooth performance, and seems to indicate the feasibility of controlling the rate of ethyl lactate hydrolysis by the choice of brine within which the reaction is carried out. Note the velocity of the formate brine reaction with respect to that carried out in NaBr brine.

There seems to be a distinct possibility that the rate of ester hydrolysis can be controlled, possibly regardless of the ester being hydrolyzed, by the selection of the brine solution medium. And, it appears that rate control depends both on the nature of the brine and upon the nature of the ester. Hydrolysis in potassium formate brine may be faster than that in the other brine solutions available in the field. Hydrolysis in sodium bromide brine solution is probably slower relative to that in other brine media. With respect to water, the nature of the ester may determine whether hydrolysis is faster or slower than that carried out in brine media. Hydrolysis of an ester which leads to the formation of a polyhydric alcohol such as glycerin is probably of greater velocity in water than in brine. Where the solubility of the ester is poor or low, this is certainly the case.

Figure 4:
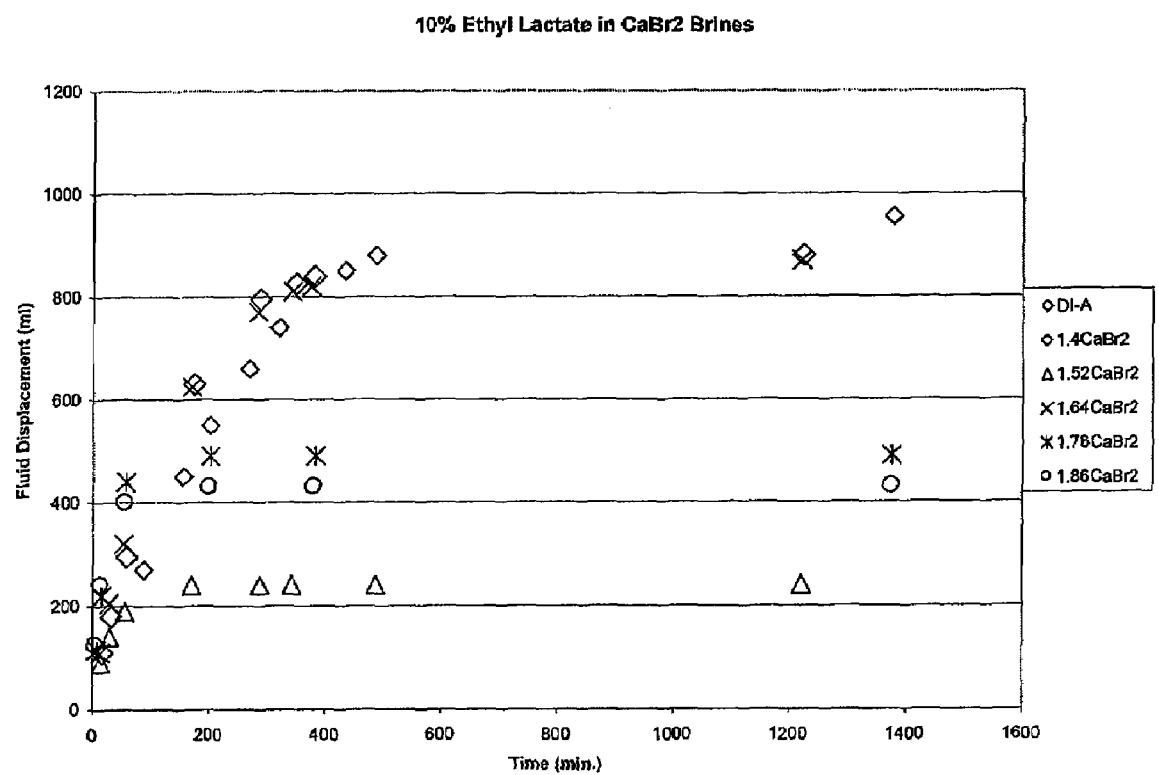
FIG. 4 is a graph of data discussed in the Examples section.

The Brine Arrays: FIG. 4 features the hydrolysis reaction of ethyl lactate in an array of calcium bromide brines of increasing concentration, more specifically, the hydrolysis of 10% ethyl lactate in water (DI-A) at a 1:1 molar ratio of ester to carbonate with calcium bromide brines of increasing concentration. With increasing brine strength, the rate of hydrolysis appeared to decrease. Note the standard reaction in neutral water. Brine strength through sp. gr. 1.53 $CaBr_2$ appears to afford hydrolysis rates roughly equivalent to that found for water. Afterwards, an abatement in rate seems to occur. This may be due to a competition for water. Ten percent ethyl lactate (in ratio to the make-up water) will precipitate salt from saturated calcium bromide brine. In the hydrolysis reaction, water is consumed, and at some point, competition for water between the hydrolysis reaction, and the dissolution of the salt, retards the rate. Water becomes unavailable to the ester hydrolysis. The hydrolysis rate slows, and, then stops. The cut-off appears to be between a brine weight of about 1.70 and about 1.76 sp. gr.

Figure 5:
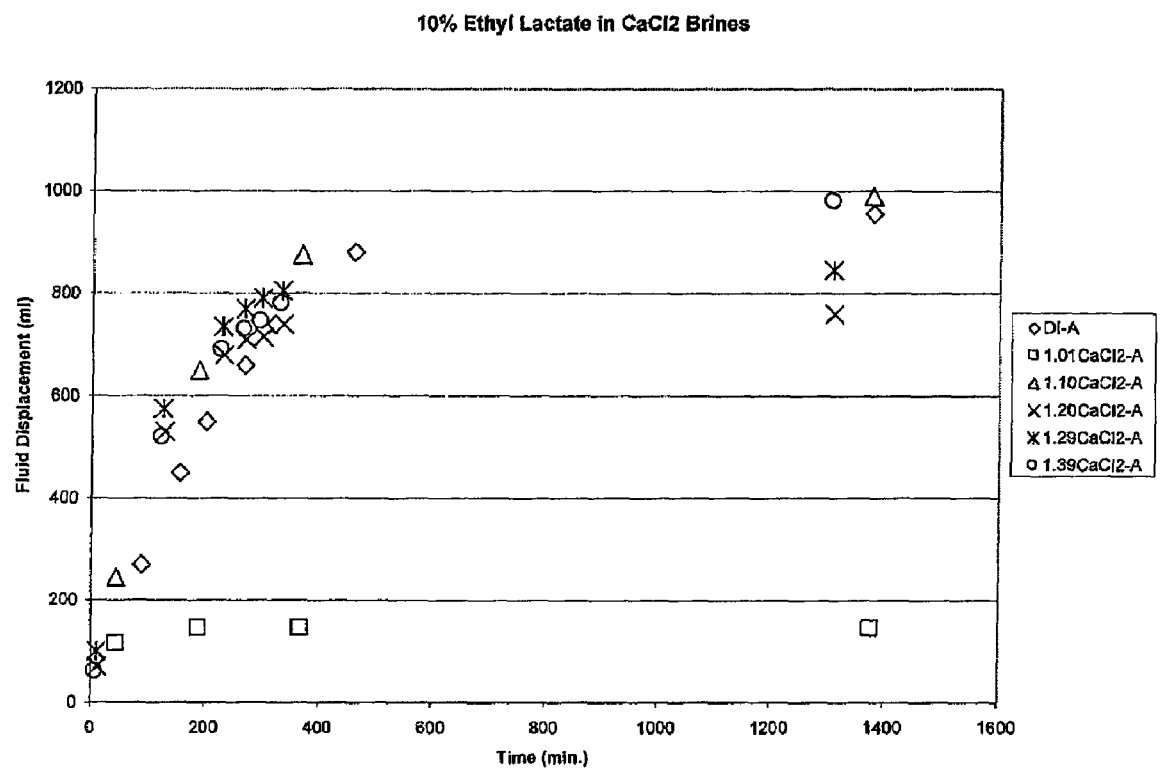
FIG. 5 is a graph of data discussed in the Examples section.

A slowing of the hydrolysis rate in calcium chloride brines may be seen, but the effect does not appear to be as severe as seen in the previous example as shown in FIG. 5, which illustrates the results of hydrolysis of 10% ethyl lactate in water (DI-A) and in calcium chloride brines of increasing concentration. Ethyl lactate in a 23% (w/v) ratio to the make-up water for 1.39 sp.gr. $CaCl_2$ brine does not appear to cause salt precipitation. Water seems to be available for ester hydrolysis, and therefore, the hydrolysis reaction proceeds.

Figure 6:
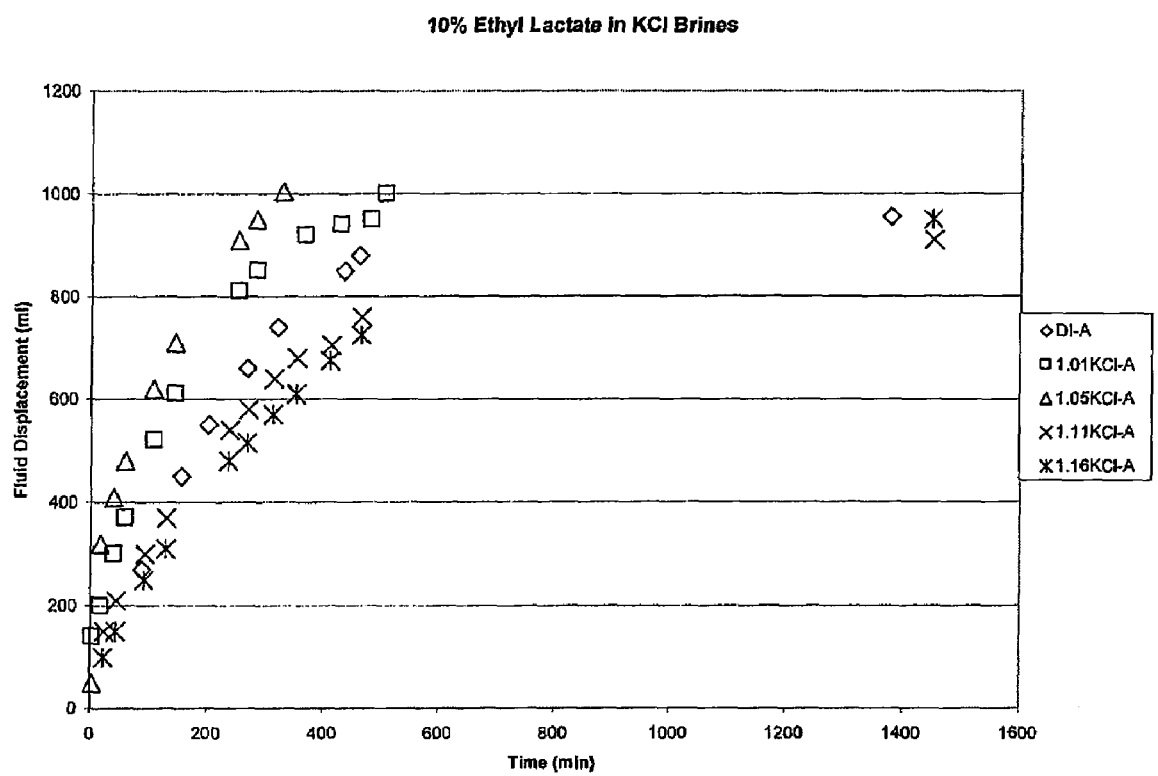
FIG. 6 is a graph of data discussed in the Examples section.

FIG. 6 illustrates the hydrolysis reactions of 10% ethyl lactate in water (DI-A) and in potassium chloride brines of increasing concentration. The standard water reaction seems to reside between two sets of brine concentration hydrolysis reactions. Hydrolysis conducted in 1.01 sp. gr. KCl brine appears to be about 30% faster than water hydrolysis. As brine concentration increases, the rate of hydrolysis appears to decrease. Again, this may be due to the solubility effect discussed above. Additionally, ethyl lactate does not precipitate potassium chloride from the 1.16 sp.gr. brine when mixed at a 23% w/v ratio to the make-up water used to make the brine at room temperature. The solution is clear and appears to be stable for at least a week.

Figure 7:
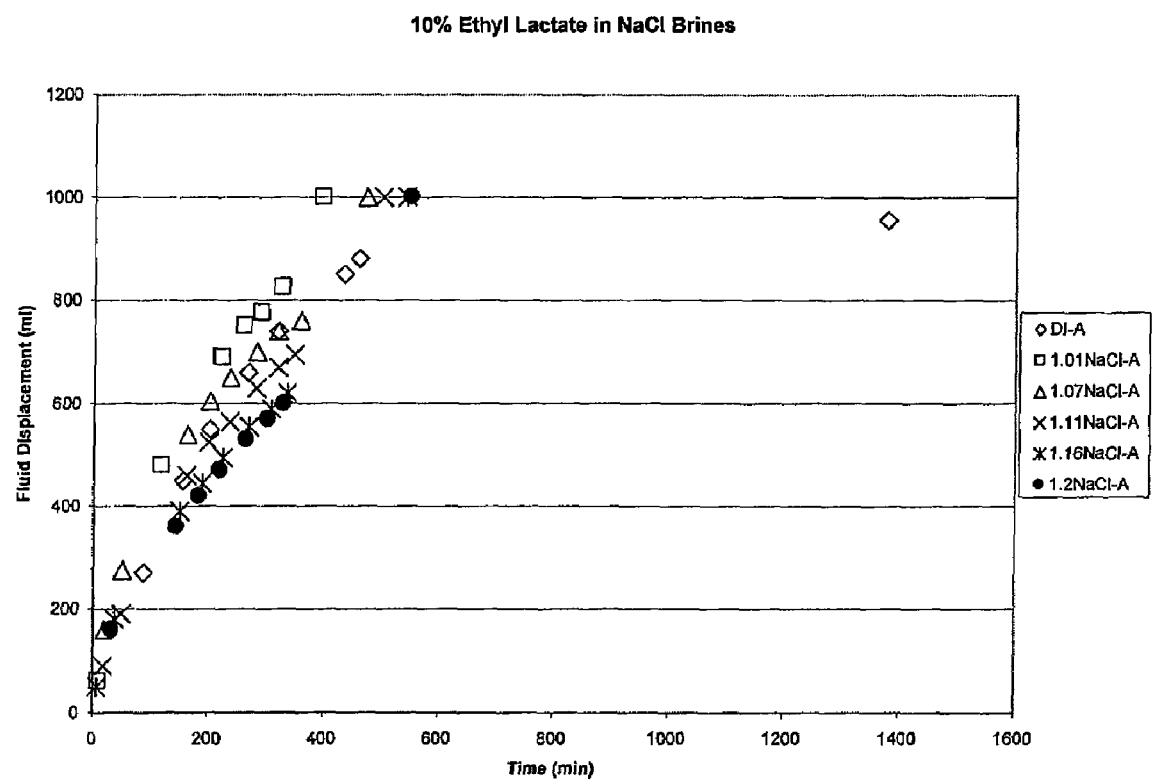
FIG. 7 is a graph of data discussed in the Examples section.

FIG. 7 contains the data for the hydrolysis of 10% ethyl lactate in water (DI-A) and in sodium chloride brines of increasing concentration. The hydrolysis rates are consistent with the other cases tested. However, 23% ethyl lactate precipitates salt from 1.2 specific gravity NaCl brine at room temperature.

Figure 8:
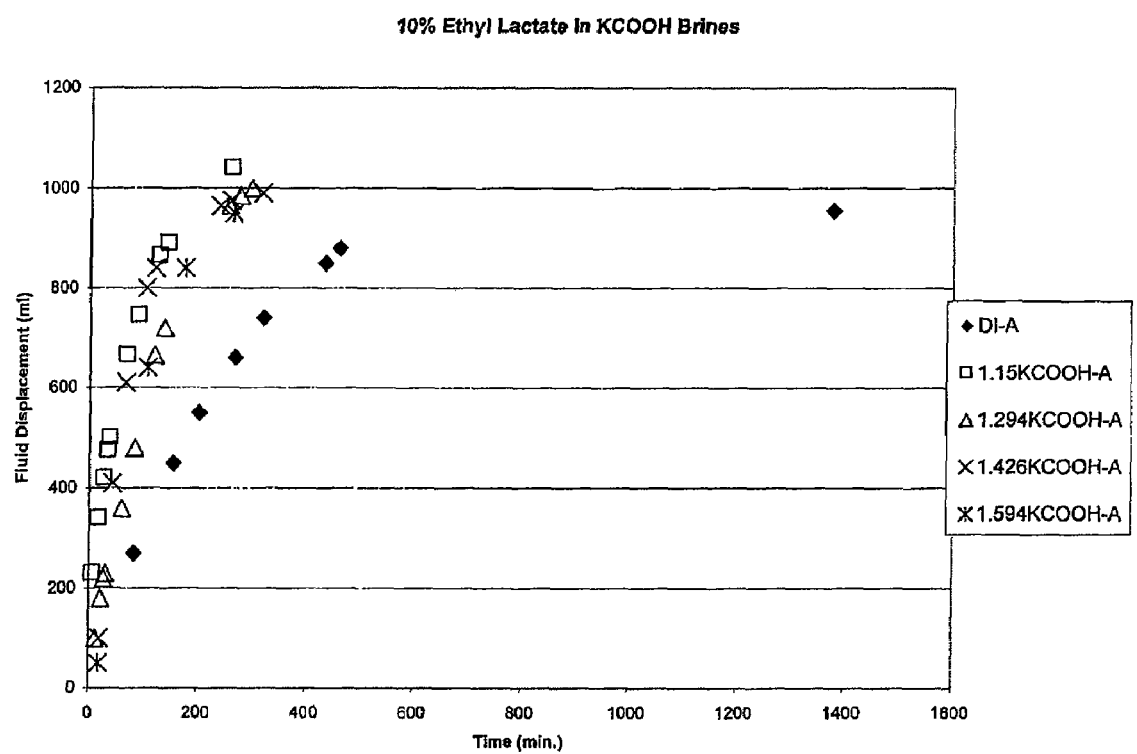
FIG. 8 is a graph of data discussed in the Examples section.

FIG. 8 contains the data for the hydrolysis of 1-% ethyl lactate in water (DI-A) and in potassium formate brines of increasing concentration. In each case, the rate of hydrolysis appears to be faster than that of water. Solubility problems may be encountered when adding ethyl lactate to this brine. Ten percent ethyl lactate and 1.426 sp. gr. KCOOH brine is a two-phase system. Potassium formate brines, prepared in our laboratory from potassium formate salts and water, does not appear to react with calcium carbonate at 100° C. A different mechanism may be involved, because the rate of ester hydrolysis cannot be limited, relative to the rates for the hydrolysis reactions of ethyl lactate in the other brine systems, because in potassium formate brines, hydrolysis is relatively fast.

Figure 9:
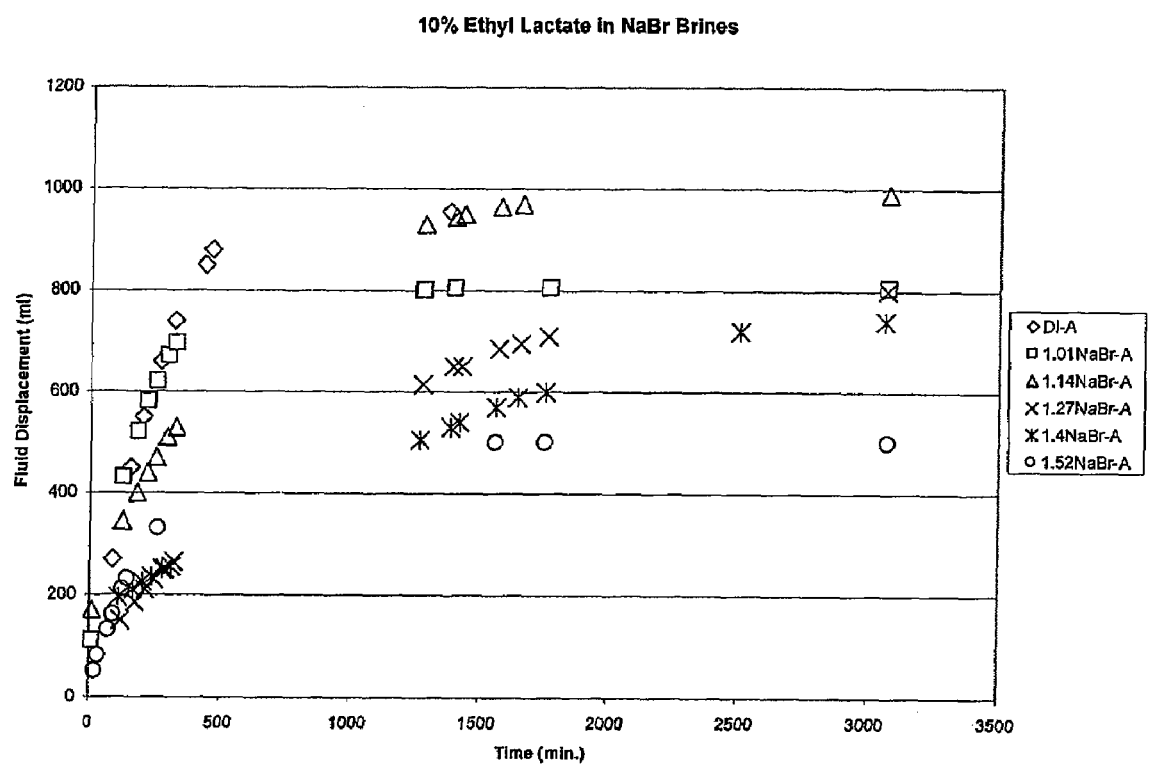
FIG. 9 is a graph of data discussed in the Examples section.

FIG. 9 contains the data from the hydrolysis of 10% ethyl lactate in water (DI-A) and in sodium bromide brines of increasing concentration. NaBr brines appear to retard the rate of ester hydrolysis. As salt concentration increases, the rate of hydrolysis decreases. It appears that the rate of hydrolysis can be controlled depending upon the concentration of the brine. Furthermore, formulation in the field should be relatively straight forward because 23% ethyl lactate (weight lactate in ratio to the make-up water used for the brine) is soluble in 1.52 sp. gr. NaBr brine.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing an acid-generating fluid that comprises an acid-generating compound, a base fluid, and a reaction rate retarding salt, wherein the reaction rate retarding salt comprises a sodium bromide salt;
   placing the acid-generating fluid in a well bore penetrating a subterranean formation;
   allowing the reaction rate retarding salt to affect the hydrolysis of the acid-generating compound so as to retard it; and
   allowing an acid to generate from the acid-generating compound.

2. The method of claim 1 wherein the acid-generating fluid comprises an additive chosen from the following group: gelling agents; diverting agents; nonemulsifiers; breakers; other acids; cross linking agents; mutual solvents; fluid loss control agents; bases; surfactants; bactericides; and combinations and derivatives thereof.

3. The method of claim 2 wherein the gelling agent is chosen from the group consisting of: natural biopolymers; synthetic polymers; crosslinked gelling agents; and viscoelastic surfactants.

4. The method of claim 2 wherein the diverting agent is chosen from the group consisting of: particulate solid diverting agents; oil-soluble resins; water-soluble rock salts; emulsions; degradable particulate diverting materials; degradable particulate diverting materials that comprise a polysaccharide, dextran, cellulose, chitins, chitosans, proteins, aliphatic polyesters, poly(lactides), poly(glycolides), poly(e-caprolactones), poly(hydroxybutyrates), poly(anhydrides), aliphatic polycarbonates, poly(orthoesters), poly(amino acids), poly (ethylene oxides), and polyphosphazenes; self-degradable particulate diverting materials; hydrates of organic acids or their salts; sodium acetate trihydrate; L-tartaric acid disodium salt dihydrate; sodium citrate dihydrate; hydrates of inorganic acids or their salts; sodium tetraborate decahydrate; sodium hydrogen phosphate heptahydrate; sodium phosphate dodecahydrate; amylose; starch-based hydrophilic polymers; cellulose-based hydrophilic polymers; and mechanical diverting agents.

5. The method of claim 1 wherein the acid-generating compound comprises an acid-generating compound chosen from the group consisting of: esters; formates; lactic acid derivatives; methyl lactate; ethyl lactate; propyl lactate; butyl lactate; formate esters; ethylene glycol monoformate; ethylene glycol diformate; diethylene glycol diformate; glyceryl monoformate; glyceryl diformate; glyceryl triformate; triethylene glycol diformate; formate esters of pentaerythritol; ethylene glycol monoformate; diethylene glycol diformate; esters of glycerol; polyesters of glycerol; tripropionin; trilactin; esters of acetic acid and glycerol; monoacetin; diacetin; triacetin; aliphatic polyesters; poly(lactides); poly(glycolides); poly($\epsilon$-caprolactones); poly(hydroxybutyrates); poly(anhydrides); aliphatic polycarbonates; poly(amino acids); polyphosphazenes; copolymers thereof; and derivatives and combinations thereof.

6. The method of claim 1 wherein the base fluid is aqueous-based or oil-based.

7. The method of claim 1 wherein the acid-generating fluid is an emulsion.

8. The method of claim 1 wherein the acid-generating fluid is placed in the well bore penetrating a subterranean formation as part of a matrix acidizing application, an acidizing application, a fracture acidizing application, a scale removal application, a damage removal application, a hydrate treatment application, a hydrate inhibition application, or an open hole diversion application.

9. The method of claim 1 wherein the acid-generating fluid comprises an additive chosen from the group consisting of: pH-adjusting agents; pH-buffers; oxidizing agents; enzymes; lost circulation materials; scale inhibitors; surfactants; clay stabilizers; corrosion inhibitors; paraffin inhibitors; asphaltene inhibitors; penetrating agents; clay control additives; iron control additives; chelators; reducers; oxygen scavengers; sulfide scavengers; emulsifiers; foamers; gases; and derivatives and combinations thereof.

10. The method of claim 1 wherein the acid acidizes at least a portion of the subterranean formation or damage therein.

11. The method of claim 1 wherein the acid-generating fluid is placed into the subterranean formation at a pressure sufficient to create or enhance a fracture in the subterranean formation.

12. A method comprising:
providing an acid-generating fluid that comprises an acid-generating compound, a base fluid, and a reaction rate accelerating salt, wherein the acid-generating compound is in liquid form;
placing the acid-generating fluid in a well bore penetrating a subterranean formation;
allowing the reaction rate accelerating salt to affect the hydrolysis of the acid-generating compound so as to accelerate it; and
allowing an acid to generate from the acid-generating compound.

13. The method of claim 12 wherein the reaction rate accelerating salt comprises a formate salt.

14. The method of claim 12 wherein the acid-generating compound comprises an acid-generating compound chosen from the group consisting of: esters; formates; lactic acid derivatives; methyl lactate; ethyl lactate; propyl lactate; butyl lactate; formate esters; ethylene glycol monoformate; ethylene glycol diformate; diethylene glycol diformate; glyceryl monoformate; glyceryl diformate; glyceryl triformate; triethylene glycol diformate; formate esters of pentaerythritol; ethylene glycol monoformate; diethylene glycol diformate; esters of glycerol; polyesters of glycerol; tripropionin; trilactin; esters of acetic acid and glycerol; monoacetin; diacetin; triacetin; aliphatic polyesters; poly(lactides); poly(glycolides); poly($\epsilon$-caprolactones); poly(hydroxybutyrates); poly(anhydrides); aliphatic polycarbonates; poly(amino acids); polyphosphazenes; copolymers thereof; and derivatives and combinations thereof.

15. The method of claim 12 wherein the acid-generating fluid is an emulsion.

16. The method of claim 12 wherein the acid acidizes at least a portion of the subterranean formation or damage therein.

17. The method of claim 12 wherein the acid-generating fluid is placed into the subterranean formation at a pressure sufficient to create or enhance a fracture in the subterranean formation.

18. A method comprising:
providing an acid-generating fluid that comprises an acid-generating compound, a base fluid, and a reaction rate retarding salt, wherein the acid-generating compound comprises at least one acid-generating compound selected from the group consisting of: an ester; a formate; a lactic acid derivative; methyl lactate; ethyl lactate; propyl lactate; butyl lactate; a formate ester; ethylene glycol monoformate; ethylene glycol diformate; diethylene glycol diformate; glyceryl monoformate; glyceryl diformate; glyceryl triformate; triethylene glycol diformate; a formate ester of pentaerythritol; ethylene glycol monoformate; diethylene glycol diformate; an ester of glycerol; a polyester of glycerol; tripropionin; trilactin; an ester of acetic acid and glycerol; monoacetin; diacetin; triacetin; an aliphatic polyester; a poly(lactide); a poly(glycolide); a poly($\epsilon$-caprolactone); a poly(hydroxybutyrate); a poly(anhydride); an aliphatic polycarbonate; a poly(amino acid); a polyphosphazene; any copolymer thereof; and any derivative thereof;
placing the acid-generating fluid into a subterranean formation;
allowing the reaction rate retarding salt to affect the hydrolysis of the acid-generating compound so as to retard it; and
allowing an acid to generate from the acid-generating fluid.

19. The method of claim 18 wherein the acid acidizes at least a portion of the subterranean formation or damage therein.

20. The method of claim 18 wherein the acid-generating fluid is placed into the subterranean formation at a pressure sufficient to create or enhance a fracture in the subterranean formation.

* * * * *